Figure 1:
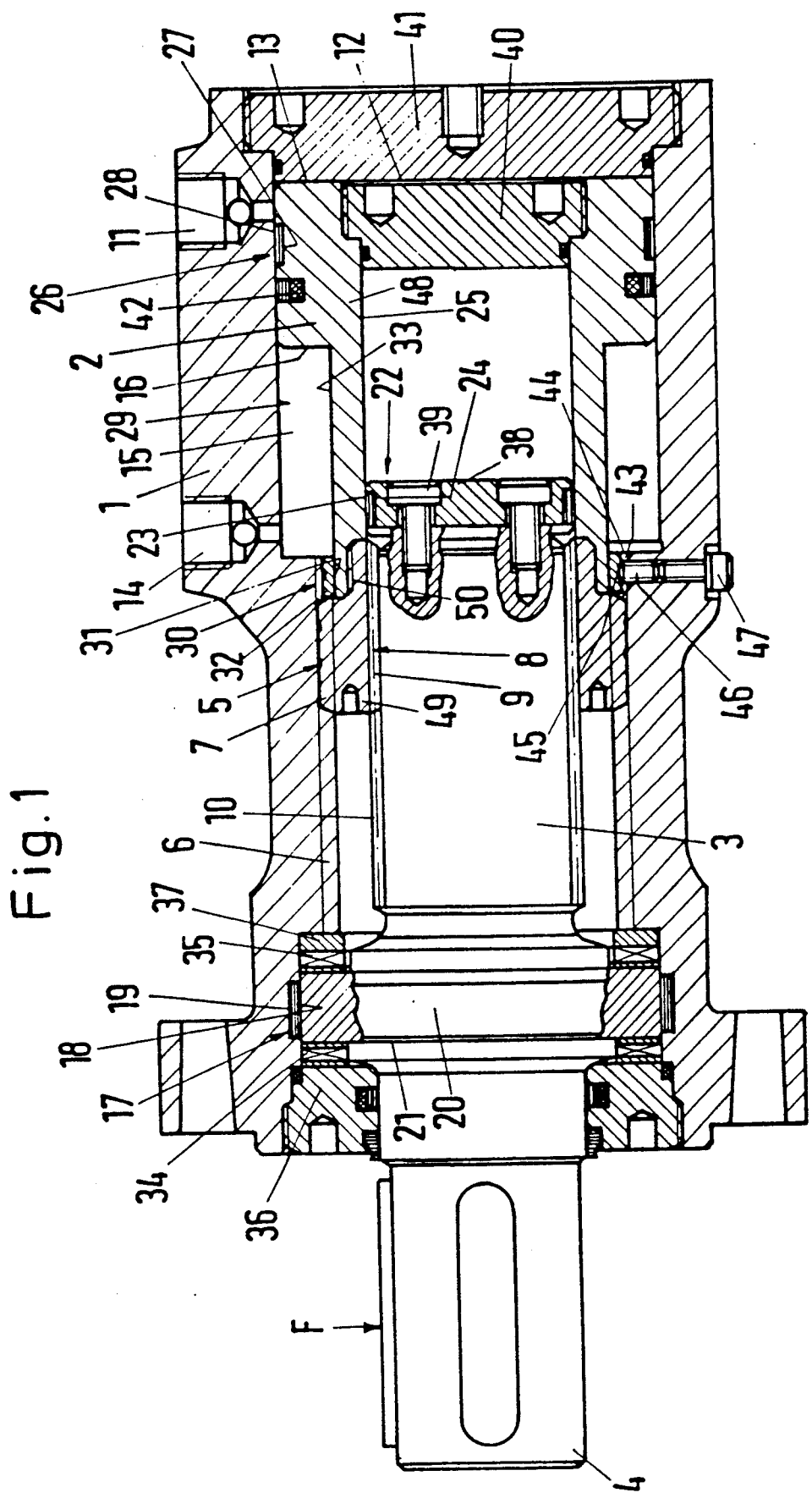

United States Patent [19]

Beuschau

[11] Patent Number: 5,038,672
[45] Date of Patent: Aug. 13, 1991

[54] HYDRAULIC ROTARY ACTUATING APPARATUS

[75] Inventor: Hans K. Beuschau, Sandved, Denmark

[73] Assignee: Danfoss A/S, Nordborg, Denmark

[21] Appl. No.: 496,370

[22] Filed: Mar. 20, 1990

[30] Foreign Application Priority Data

Mar. 25, 1989 [DE] Fed. Rep. of Germany ....... 3909910

[51] Int. Cl.$^5$ .............................................. F01B 3/00
[52] U.S. Cl. .......................................... 92/33; 92/116; 92/113; 92/DIG. 1; 74/99 A
[58] Field of Search ............. 92/33, 113, 116, DIG. 1, 92/31, 32; 74/99 A

[56] References Cited

U.S. PATENT DOCUMENTS

| B 429,434 | 2/1976 | Burkhardt et al. | 92/116 |
|---|---|---|---|
| 2,225,790 | 12/1940 | Nardone | 92/33 |
| 2,688,951 | 9/1954 | Sears | 92/113 |
| 2,951,558 | 9/1960 | Schuster | 92/DIG. 1 |
| 3,141,390 | 7/1964 | McAlpine | 92/DIG. 1 |
| 4,373,426 | 2/1983 | Weyer | 92/33 |
| 4,603,616 | 8/1986 | Zajae | 92/33 |
| 4,745,847 | 5/1988 | Voss | 92/33 |

Primary Examiner—Edward K. Look
Assistant Examiner—F. Daniel Lopez
Attorney, Agent, or Firm—Wayne B. Easton; Clayton R. Johnson

[57] ABSTRACT

The apparatus includes a steeped axially displaceable piston in a stepped cylinder housing, and a rotary shaft is axial fixed relative to the housing and extends into the piston reduced diameter end portion. The piston reduced diameter portion and the housing having a cooperating set of first teeth while the piston and shaft have a cooperating set of second teeth whereby at least one set of the teeth serve to convert axial movement of the piston into rotary motion of the shaft. The shaft is supported in the housing adjacent where it exits from the housing by a first bearing while a second bearing is provide radial adjacent to the juncture of the housing enlarged and reduced diameter portions that supports the interior end portion of the shaft in the piston reduced diameter portion. A third radial bearing is provided between the enlarged diametric portion and the piston enlarged diametric portion in axial remote relationship to the first bearing. A fourth radial bearing is provided between the piston reduced portion and the housing and in the housing reduced diameter portion adjacent its juncture with the enlarged diametric portion. As a result when a radial force acts on the shaft exterior of the housing, the resulting torque is taken up by the first and second bearings.

15 Claims, 2 Drawing Sheets

HYDRAULIC ROTARY ACTUATING APPARATUS

The invention relates to a hydraulic rotary actuating apparatus comprising a housing, a stepped axially displaceable piston therein and a rotatable axially fixed shaft, first teeth between the piston and housing and second teeth between the piston and shaft, at least one of these sets of teeth converting the axial piston movement into rotary motion, wherein the shaft is supported in the housing by a first radial bearing near where it leaves the housing and also by a second radial bearing.

Such a rotary actuating apparatus is known from U.S. Pat. No. 4,373,426. The two sets of teeth are in the form of steep helical screwthreads. When the piston is displaced axially, the shaft is turned. The shaft is supported in the housing by means of two directly adjacent radial bearings in the form of conical roller bearings having opposite inclinatins. When the stub shaft leaving the housing is loaded radially, these radial bearings are loaded by oppositely directed radial forces. By reason of the small spacing between the radial bearings, these radial forces can assume comparatively large values. This is particularly so for the second bearing. Corresponding wear of the bearing makes it necessary for an increasingly large part of the radial forces to be dissipated through the teeth. Consequent friction makes it necessary to apply a larger hydraulic force to achieve the rotary motion or the delivered torque is reduced.

In another known rotary actuating apparatus (U.S. Pat. No. 4,313,367), the shaft passes through the entire housing and is supported at both ends at the housing by way of radial bearings. This keeps the load on the bearings small. However, the throughgoing shaft takes up a considerable proportion of the piston area. For this reason, the rotary actuating apparatus has to be larger for a given performance. Because of the large bearing spacing, the shaft is bent on radial loading of the end of the shaft. This likewise leads to a friction load on the teeth and thus to a reduction in the output torque.

The invention is based on the problem of providing a hydraulic rotary actuating apparatus of the aforementioned kind with which the radial forces occurring on radial loading of the free shaft end can be transmitted to the housing better than hitherto.

This problem is solved according to the invention in that the second radial bearing is formed between the shaft and piston and that the piston is in turn supported at the housing by way of a third radial bearing and a fourth radial bearing axially offset therefrom.

The position of the second radial bearing leads to a medium bearing spacing which is neither so small that excessive radial forces are set up nor so large that there is a danger of the shaft bending. These radial forces are not taken up by the housing but by the piston. To transmit these radial forces to the housing without loading the first set of teeth, the third and fourth radial bearings are provided. The use of more than one additional radial bearing takes account of the fact that the piston can assume different axial positions when transmitting the radial force. On the whole, therefore, one obtains a rotary actuating apparatus which gives the largest possible torque for a given imput energy throughout its entire life.

It is particularly favourable for the second radial bearing to be formed by a bearing surface at the shaft and a hollow cylindrical section at the piston. Directly interengaging surfaces can therefore be used.

In this connection it is advisable for the bearing surface and the hollow cylindrical section to adjoin the second set of teeth. This results in a short axial constructional length.

It is also favourable for the bearing surface to be formed on a plate of which the end is fixed to the shaft. During assembly, this plate can be radially displaced relatively to the shaft to obtain accurate centering. In addition, it may be made of bearing metal and form the bearing surface. However, it is also possible for the bearing surface to be formed by a one-piece bearing ring which is pushed on to the plate.

Further, it is favourable for the end of the piston to carry a plate which closes the hollow cylindrical section. This construction facilitates assembly but leaves a large end surface available for the piston.

In a further development, the third radial bearing is formed by a bearing surface at the piston portion of the largest diameter and a hollow cylindrical section of the housing. In this case, an available guiding surface is utilised for the piston for bearing purposes.

In this connection, it is favourable for the end of the housing to carry a plate which closes the hollow cylindrical section. This, again, simplifies production and assembly.

In a preferred embodiment, the fourth radial bearing is formed by a bearing surface at the housing and a cylindrical section at a piston portion of smaller diameter. This permits one to accommodate the fourth radial bearing without increasing the cross-section in the radial direction.

If, in addition, the bearing surface and cylindrical section adjoin the corresponding portions of the first set of teeth, the axial length can also be maintained with practically no alteration.

It is an advantage for the piston to consist of two interconnected parts, one of which comprises the corresponding sections of the first and second teeth and the other the cylindrical and hollow cylindrical sections. This facilitates manufacture of the teeth sections on the one hand and the cylindrical and hollow cylindrical sections on the other hand.

It is also favourable for the bearing surface to be formed by a bearing ring inserted at a step of the housing. The bearing ring for the fourth radial bearing can be axially inserted at such a step.

The bearing ring may also be segmented. This is particularly advisable in the case of unsegmented pistons.

Another advantage is for the bearing ring to be supported on the outside by a plurality of setscrews. The position of the bearing ring can be adjusted with the aid of the setscrews. It can be accurately centered so that no interfering radial forces have to be led away through the first teeth.

In particular, the bearing ring may have an annular groove on the outside in which the points of the setscrews engage. This results in a secure position.

Figure 2:
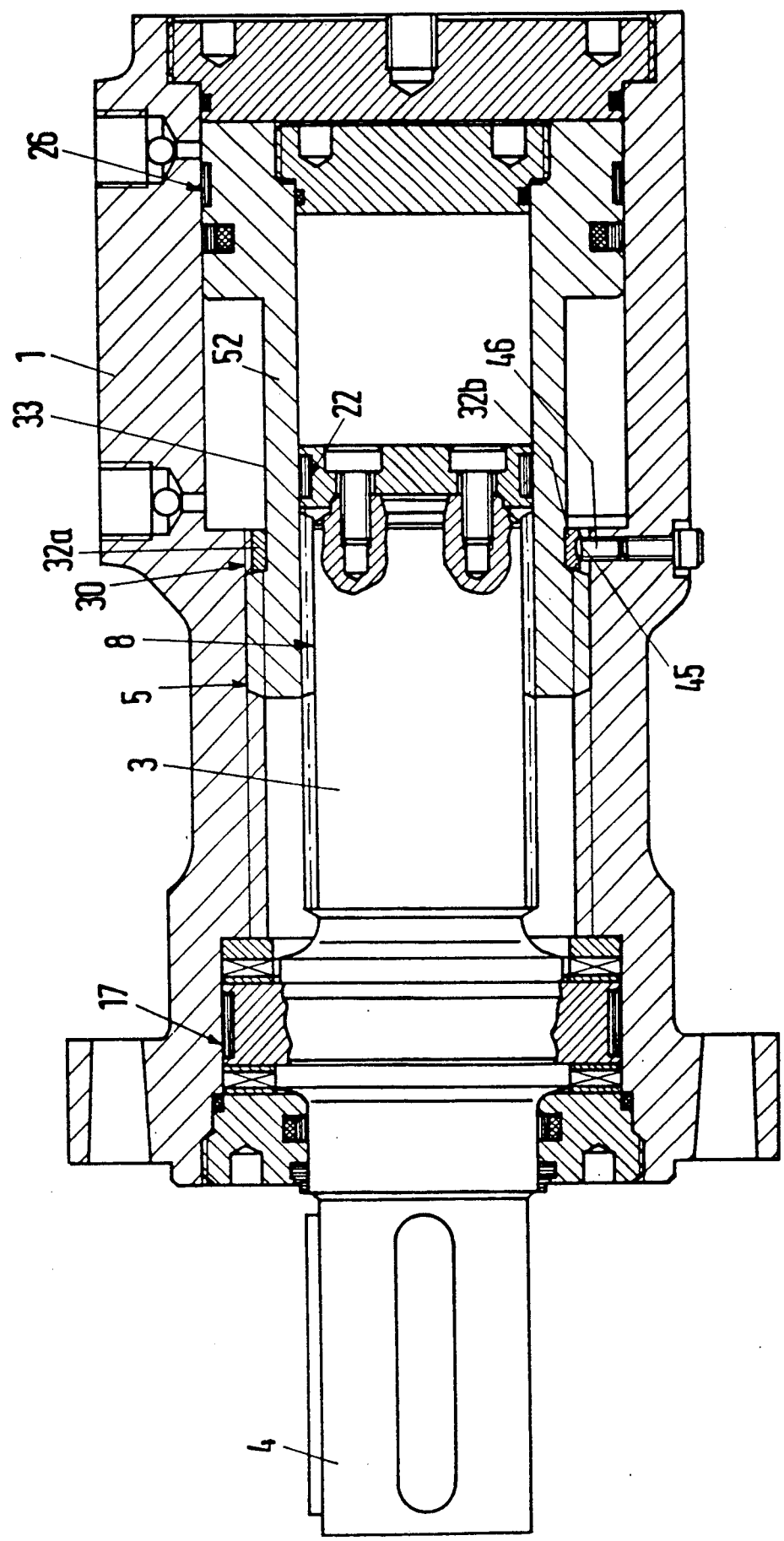

Two preferred examples of the invention will now be described with reference to the drawing, wherein:

FIG. 1 is a part longitudinal section through a hydraulic rotary actuating apparatus according to the invention; and FIG. 2 shows a modified embodiment.

The hydraulic pressure actuating apparatus of FIG. 1 comprises a housing 1, a stepped piston 2 and a shaft 3. Its stub-shaft 4 serves to turn a load. A first set of teeth 5 has a section 6 at the housing 1 and a section 7 at the piston 2. A second set of teeth 8 has a section 9 at the piston 2 and a section 10 at the shaft 3. The first set of teeth 5 is in the form of a steep screwthread and the second set of teeth 8 in the form of spur teeth (key and groove connection). If pressure fluid is fed through a connection 11 into a pressure chamber 12, the pressure will act on the entire end face 13 of the piston 2. The latter will move to the left to result in rotation of the shaft 3 through a predetermined angle, especially up to 360°. On the other hand, if pressure fluid is fed through a connection 14 into a pressure chamber 15, the pressure will act on the other side of the piston 2, namely on the step 16, the inside of the cover 40 and the screwthreaded ring 49. The piston will be displaced to the right and turn the shaft back correspondingly.

A first radial bearing 17 is formed by the bearing surface 18 of a bearing ring 19 and the circumferential surface 20 of a shaft flange 21. A second radial bearing 22 is formed by the bearing surface 23 of a bearing ring 24 and by a hollow cylindrical section 25 of the piston 2. A third radial bearing 26 is formed by a bearing surface 27 of a bearing ring 28 in the piston portion of largest diameter and a hollow cylindrical section 29 of the housing 1. A fourth radial bearing 30 is formed by the bearing surface 31 of a bearing ring 32 and a cylindrical section 33 of the piston. Thus, when a radial force F acts on the stub shaft 4, the resulting torque is taken up by the first radial bearing 17 and the second radial bearing 22. The latter transmits a force to the piston 2. This transmits the forces to the housing 1 by way of the two radial bearings 26 and 30. The teeth 5 and 8 therefore remain substantially unloaded by radial forces.

The shaft flange 20 belonging to the first radial bearing 17 is disposed between two axial bearings 34 and 35. A screwthreaded ring 36 presses this arrangement against a housing ring 37.

The bearing ring 24 of the second radial bearing 22 is disposed at the end of the tooth section 9 and the hollow cylindrical section 25 at the end of the tooth section 10 of the second set of teeth 8. The bearing ring 24 is on a plate 38 through which securing screws 39 pass with a little play. One can therefore assemble the piston 2 and shaft 3 and then introduce the plate 38 and accurately center same. To permit suitable access, the piston 2 has an end plate 40 and the housing an end plate 41, which plates are secured to the appropriate parts by means of external screwthreads.

The bearing ring 27 of the third radial bearing 26 is arranged next to a conventional piston seal 42.

The bearing ring 32 of the fourth radial bearing 30 is axially inserted in a circumferential groove 43 which extends up to a step 44 of the housing 1. The groove 43 has a shallower depth than the first set of teeth 5. The bearing ring 32 has a circumferential groove 45 in which the points of several uniformly circumferentially distributed setscrews 46 engage. The position of the setscrews is secured by a second screw 47. With the aid of these setscrews, the bearing ring 32 can be accurately centered with respect to the piston 2.

For simpler assembly, the piston 2 consists of two parts 48 and 49 interconnected by a screwthread 50. The part 48 carries the hollow cylindrical section 25 of the second radial bearing 22 and the cylindrical section 32 of the fourth radial bearing 30. The second section 49 carries the tooth section 7 of the first set of teeth 5 and the tooth section 9 of the second set of teeth 8. Even before assembly of the piston 2 in the housing 1, the bearing ring 32 can be pushed on to the cylindrical section 33, whereupon the part 49 of the piston is screwed on. Finally, the thus preassembled piston is pushed into the housing 1 whereby the bearing ring 32 enters the groove 43. It is there locked by the setscrews 46.

The modification of FIG. 2 corresponds substantially to that of FIG. 1. What is different is that the piston 52 is made in one piece. Instead, the bearing ring 32 consists of two parts 32a and 32b. Before building the piston 52 into the housing 1, these are laid around the cylindrical section 33 and then held together, for example by a rubber band which engages in the circumferential groove 45. After the piston 52 has been inserted in the housing 1, the ring parts 32a and 32b are supported by the setscrews 46.

Many changes can be made from the illustrated embodiments without departing from the basic concept of the invention. For example, the teeth 7 may have a steep screwthread and the teeth 5 spur teeth. However, both sets of teeth may be of screwthreaded form. The bearing ring 32 can be held in the housing in some other way, for example by a press fit or adhesive. The maximum rotation of the shaft 3 can also amount to more than 360°.

What is claimed is:

1. A hydraulic rotary actuating apparatus, comprising an axial cylinder housing having a first end portion and an axially opposite second end portion, an axially stepped piston axially displaceable within the housing, a shaft extending through the housing first end portion to extend both exteriorily of and interiorily into the housing and being in axially fixed relationship to the housing, the housing and piston having a first set of cooperating teeth, the piston and shaft having a second set of cooperating teeth, at least one of the sets of teeth having means for converting axial piston movement into rotary shaft motion as the piston is axially displaced in the housing, first radial bearing means for rotatably mounting the shaft in the housing first end portion, second radial bearing means extending between the shaft and the piston for supporting the shaft for rotary movement, and third radial bearing means and fourth bearing means between the piston and the housing for supporting the piston in the housing for movement relative to the housing, the fourth bearing means being axially offset from the third bearing means.

2. The apparatus according to claim 1, characterized in that the piston has a first diametric portion and a second diametric portion of a larger diameter than the first diametric portion, that the housing has a hollow cylindrical portion radially adjacent to the second diametric portion and that the third bearing means is at least in part defined by a second diametric portion surface radially adjacent to the cylindrical portion.

3. The apparatus according to claim 2, characterized in that the hollow section has a first axial end, and that the housing includes a cover for closing hollow section first end.

4. The apparatus according to claim 1, characterized in that the housing has an inner peripheral wall, that the piston has a hollow cylindrical portion radially adjacent to the housing inner peripheral wall and that the second bearing means is at least in part defined by a shaft bearing surface radially adjacent to the hollow cylindrical portionl.

5. The apparatus according to claim 4, characterized in that the second set of teeth are located in axial spaced relationship to the bearing surface.

6. The apparatus according to claim 5, characterized in that the shaft has an axial end portion extended into the hollow section and a plate secured to the shaft end portion to rotated therewith, and that the second bearing means includes a one piece bearing ring mounted by the plate in bearing relationship to the hollow section surface.

7. The apparatus according to claim 6, characterized in that the hollow cylindrical section has an end portion axially remote from the shaft, and that the piston includes an end plate for closing the hollow section end portion.

8. The apparatus according to claim 1, characterized in that the piston has a first diametric portion and a second diametric portion of a smaller diameter than the diameter of the first diametric portion, the second diametric portion comprising a hollow cylindrical section of a smaller outer diameter than the diameter of the first diametric portion, and that the fourth bearing means is defined by bearing surfaces at the housing and the hollow cylindrical section.

9. The apparatus according to claim 8, characterized in that the bearing surfaces are axially adjacent to the first set of teeth and radially outwardly of the second bearing means.

10. The apparatus according to claim 8, characterized in the piston includes first and second axial parts removably connected together, the first part in part defining the first and second sets of cooperating teeth and the second part having the first diametric portion.

11. The apparatus according to claim 8, characterized in that the housing has a first inner peripheral wall portion and a second peripheral wall portion of a smaller inner diameter than the inner diameter of the first inner diameter portion and opening to the first wall portion, the bearing surfaces being at least in part defined by a bearing ring at the second wall portion and axially adjacent to the opening of the second wall portion to the first wall portion.

12. The apparatus according to claim 11, characterized in that there is provided setscrews extending exterior of and into the housing for supporting the bearing ring.

13. The apparatus according to claim 12, characterized in that the bearing ring is segmented.

14. The apparatus according to claim 12, characterized in that the bearing ring has a radial outer, annular groove into which the set screws extend.

15. A hydraulic rotary actuating apparatus, comprising an axial cylinder housing having a first axial inner peripheral wall portion and a second axial inner peripheral wall portion of a larger diameter than the first wall portion and opening thereto to form an annular step, an axially stepped piston axially displaceable within the housing and having a first annular axial section extending within the first inner peripheral wall portion and a second axial section located in the second wall portion and joined to the first section, a shaft in fixed axial relationship to the housing, extending exterior of the housing and having an end portion extending into the annular section, the housing first wall portion and piston first section having a first set of cooperating teeth, the piston first section and shaft having a second set of cooperating teeth, at least one of the sets of teeth having means for converting axial piston movement into rotary shaft motion as the piston is axially displaced in the housing, first radial bearing means for rotatably mounting the shaft in the housing first wall portion, second radial bearing means extending between the shaft and the piston first section for supporting the shaft in the piston for movement relative thereto, the second bearing means being axially spaced from the first bearing means and axially more closely adjacent to the second wall portion than the first bearing means, third radial bearing means between the piston and the housing second wall portion for supporting the piston for movement relative to the housing, the third bearing means being axially more remote from the first bearing means than the second bearing means, fourth bearing means axially offset from the third bearing means for supporting the piston in the housing for movement as the piston is moved relative to the housing, the housing second wall portion having fluid connections for applying pressurized fluid for axially displacing the piston in the housing.

* * * * *